United States Patent Office 3,227,689
Patented Jan. 4, 1966

3,227,689
PROCESS FOR THE PREPARATION OF HIGH MOLECULAR-WEIGHT FORMALDEHYDE POLYMERS
Willem J. van Asselt, Geleen, Johannes J. M. Evers, Sittard, and Maria H. Gielen, Geleen, Netherlands, assignors to Stamicarbon N.V., Heerlen, Netherlands
No Drawing. Filed Jan. 29, 1962, Ser. No. 169,595
Claims priority, application Netherlands, Feb. 1, 1961, 260,727
10 Claims. (Cl. 260—67)

The present invention relates to a process for the preparation of high molecular-weight formaldehyde polymers by polymerizing formaldehyde in a liquid dispersing medium.

It is known that in this type of polymerization reaction, initiators are usually added to the dispersing medium to increase the rate of polymerization and the yield of polymer product. Many kinds of compounds have previously been suggested as initiators to be used for this purpose, for instance: aliphatic, cycloaliphatic or aromatic amines; hydrazines and morpholines; polymers containing tertiary nitrogen; aliphatic, cycloaliphatic or aromatic tertiary phosphines, arsines and stibines; carbonyls of certain metals; metal compounds such as hydrides, alkyls, alcoholates, mercaptides and salts; quaternary ammonium and phosphonium salts or tertiary sulfonium salts; and certain organic sulphur compounds such as tetramethyl thiuram disulfide or compounds derived from dithiocarbamic acid.

According to the present invention, it has now been found that compounds selected from the group consisting of tertiary phosphines, arsines, or stibines, in which at least one of the substituents is a disubstituted amino radical or a heterocyclic amino radical, or the corresponding quaternary salts thereof are eminently suited for use as initiators in the polymerization mentioned.

More particularly, the present invention constitutes an improvement in the preparation of high molecular-weight formaldehyde polymers by the polymerization of formaldehyde in a liquid polymerization or dispersing medium and in the presence of a substance acting as a polymerization initiator, said improvement involving the use of at least one initiator selected from the compounds having the general formula $M(R)_3$ in which M represents a phosphorus, arsenic, or antimony atom;
At least one of the R substituents is an amino radical substituted by two identical or non-identical alkyl, cycloalkyl, aryl, or aralkyl radicals, or a heterocyclic amino radical, and
The remaining R substituents represent identical or non-identical alkyl, cycloalkyl, aryl, or aralkyl radicals.

Typically, the alkyl radicals may be lower alkyls containing up to, for example, five carbon atoms or longer chain alkyl such as stearyl (that is, up to 18 carbon atoms), etc. As examples of aryl radicals, there may be mentioned phenyl and naphthyl and such radicals substituted with alkyl, halogen, amino, alkoxy and the like. Cycloalkyl radicals may include cyclohexyl and cyclopentyl while examples of aralkyl are benzyl and substituted counterparts thereof. Illustrative heterocyclic amino radicals are piperidino, morpholino, etc. It is also a feature of the present invention that more than one or a mixture of such compounds may be utilized as the initiator.

Specific examples of compounds which can be used as the initiator in the present process are: tri-(dimethylamino)-phosphine, tri-(diethylamino)-phosphine, tri-(di-n-butyl amino)-phosphine, tri-(diphenyl amino)-phosphine, tri-(methylphenyl amino)-phosphine, tri-piperidyl phosphine, di-(diethylamino)-monoethyl-phosphine, mono-(diethylamino)-diethyl phosphine, mono-(diethylamino)-diphenyl phosphine, tri-(diethylamino)-stearyl phosphonium bromide, tri-(diethylamino)-decyl phosphonium acetate, tri-(diethylamino)-arsine, tri-(di-n-propylamino)-arsine, mono-(diethylamino)-diphenyl arsine, tri-(diethylamino)-stibine, di-(diethylamino)-monoethyl stibine.

The initiators according to the invention are in general very active and should be used in small amounts only, e.g. in amounts varying from 0.0001 to 0.05 molpercent with respect to the amount of formaldehyde to be polymerized. In some cases it is possible to use even smaller amounts of the initiator but, in general, no additional advantage is obtained by using an amount exceeding the indicated upper limit of 0.05 mol-percent.

It is possible to add the initiator as such to the liquid medium in which the polymerization takes place. However, in most cases it is recommended that the initiator be added to the polymerization medium in the form of a solution in a liquid, preferably the dispersing agent or medium in which the polymerization takes place. Dispersing agents or liquid media which can be advantageously used for present purposes are hydrocarbons, such as pentane, hexane, heptane, cyclohexane, decalin, benzene, toluene, xylene, or mixtures of hydrocarbons, such as gasoline and kerosene. The invention is not, however, limited to the use of a hydrocarbon medium as other liquids, such as ethers or halogenated hydrocarbons, may also be used.

If desired, the initiator may be used in combination with known initiators, such as tertiary amines, phosphines, arsines, stibines, or quaternary ammonium or phosphonium salts. Furthermore, in addition to the substances mentioned, other compounds such as chain transfer agents, antioxidants, stabilizers, fillers, pigments and like substances may be added during the polymerization. In any case, the polymerization may be carried out continuously or discontinuously.

The formaldehyde used in the polymerization can be obtained in several known ways. Thus, for example, the formaldehyde used herein may be obtained by thermal decomposition of a hemiformal or a low molecular-weight formaldehyde polymer, such as paraformaldehyde. Alternatively, the formaldehyde may be obtained by decomposition of trioxane or by thermal decomposition of compounds and/or mixtures consisting essentially of formaldehyde and water, in the presence of a substance showing an acid reaction and having a very low volatility under the reaction conditions.

The polymerization of formaldehyde according to the present invention is desirably, but not necessarily, carried out at a temperature between about −10 to 60° C. and a pressure of between about 0.5 to 5 atmospheres.

The invention is illustrated, but not limited, by the following examples:

*Example 1*

Formaldehyde, obtained by decomposition of 75 g. of paraformaldehyde (containing 89 percent by weight of formaldehyde) suspended in 500 ml. of dioxane to which 5 ml. of 50% phosphoric acid had been added, was introduced into a polymerization reactor containing 1150 ml. of n-heptane and 2 ml. of a 0.11 molar solution of tri-(diethyl amino)-phosphine in n-heptane, via a reflux cooler and two cooling vessels, the temperature of which was kept at −15° C. During the polymerization the temperature of the dispersing medium was kept at approximately 15° C. and an amount of 0.875 mmol of formic acid (as 0.1 molar solution in dioxane) was added as chain transfer agent. The total duration of the polymerization was 105 minutes. An amount of 67 g. of high molecular-weight formaldehyde polymer, representing the theoretical yield, was obtained. The inherent viscosity of the product (determined on a 0.5% solution in p-chlorophenol at 60° C.) was 2.66.

The above example was repeated using only 0.055 mmol of tri-(diethylamino)-phosphine as initiator. This also gave the theoretical yield of high molecular-weight polymer with an inherent viscosity of 2.02.

*Example 2*

Formaldehyde, obtained by decomposition of 60 g. of paraformaldehyde (98 percent by weight of formaldehyde) suspended in a mixture of 250 ml. of kerosene and 250 ml. of dioxane to which 2.6 g. of 50% phosphoric acid had been added, was introduced into a polymerization reactor containing 1000 ml. of n-heptane and 5 ml. of an 0.1 molar solution of tripiperidyl phosphine in n-heptane as described in Example 1. The contents of the polymerization reactor were kept at approximately 22° C. During the polymerization, an amount of 7.92 mmols of methanol (as 0.33 molar solution in benzene) was added as chain transfer agent. After 90 minutes, 52 g. of high molecular-weight formaldehyde polymer were obtained corresponding to a yield of 88.8%. The inherent viscosity of the product amounted to 1.75.

*Example 3*

Formaldehyde obtained by decomposition of 60 g. of paraformaldehyde (98 percent by weight of formaldehyde) suspended in 500 ml. of dioxane to which 2.2 g. of 50% phosphoric acid had been added, was introduced into a polymerization reactor containing 1000 ml. of n-heptane and 5 ml. of a 0.06 molar solution of tri-(diethylamino)-arsine in n-heptane as described in the preceding examples. The contents of the polymerization reaction were kept at approximately 23° C. During the polymerization, an amount of 7.04 mmols of methanol was added as chain transfer agent. After 80 minutes, 53.5 g. of high molecular-weight formaldehyde polymer were obtained. This corresponds to a yield of 91%.

It will be appreciated from the foregoing that various modifications may be made in the invention described herein. Hence, the scope of the invention is defined in the following claims wherein we claim:

1. In a process for preparing high molecular-weight formaldehyde polymers by polymerizing formaldehyde in a liquid dispersing medium and in the presence of a polymerization initiator, the improvement wherein the initiator is at least one compound having the formula $M(R)_3$ wherein:
   M is an atom selected from the group consisting of phosphorus, arsenic and antimony atoms;
   at least one of the R substituents is selected from the group consisting of heterocyclic amino radicals and amino radicals in which the hydrogen atoms are replaced by radicals selected from the group consisting of alkyl up to 18 carbon atoms, cyclopentyl, cyclohexyl, phenyl, naphthyl, and benzyl, and
   the remaining R substituents are selected from the group consisting of alkyl, cycloalkyl, aryl and aralkyl radicals.

2. The process of claim 1 wherein the amount of the initiator is from 0.0001 to 0.05 mol-percent based on the amount of formaldehyde to be polymerized.

3. The process of claim 1 wherein a mixture of said compounds is utilized as the initiator.

4. The process of claim 1 wherein the liquid dispersing medium is a hydrocarbon having from 5 to 10 carbon atoms per molecule.

5. The process of claim 1 wherein the formaldehyde utilized is obtained by decomposition of paraformaldehyde.

6. The process of claim 1 wherein the initiator is tri-(diethyl amino)-phosphine.

7. The process of claim 1 wherein the initiator is tri-(diethyl amino)-arsine.

8. The process of claim 1 wherein the initiator is tripiperidyl phosphine.

9. In a process for preparing high molecular-weight formaldehyde polymers by polymerizing formaldehyde in a liquid dispersing medium and in the presence of a polymerization initiator, the improvement wherein the initator is at least one compound having the formula $M(R)_3$ wherein:
   M is an atom selected from the group consisting of phosphorus, arsenic and antimony atoms;
   at least one of the R substituents is selected from the group consisting of heterocyclic amino radicals and amino radicals in which the hydrogen atoms are replaced by radicals selected from the group consisting of alkyl up to 18 carbon atoms, cyclopentyl, cyclohexyl, phenyl, naphthyl, and benzyl, and
   the remaining R substitutents are selected from the group consisting of alkyl, cycloalkyl, aryl and aralkyl radicals,
said initiator being added in the form of a solution in a liquid to the polymerization medium in an amount varying from about 0.0001 to about 0.05 mol percent based on the weight of the formaldehyde to be polymerized, and the polymerization is carried out at a temperature from about −10 to about 60° C. and a pressure from about 0.05 to about 5 atmospheres.

10. In a process for producing high molecular weight polyoxymethylenes by polymerizing monomeric formaldehyde in an inert solvent medium in the presence of a polymerization catalyst, the improvement consisting of effecting the polymerization in the presence of tripiperidyl phosphine as the polymerization catalyst, and recovering the high molecular weight polyoxymethylenes produced.

References Cited by the Examiner

UNITED STATES PATENTS

| | | | |
|---|---|---|---|
| 1,940,383 | 12/1933 | Woodstock | 260—551 |
| 2,160,841 | 6/1939 | Dreyfus | 260—551 |
| 2,734,889 | 2/1956 | Starr | 260—67 |
| 2,828,286 | 3/1958 | MacDonald | 260—67 |
| 2,969,345 | 1/1961 | Coover et al. | 260—94.9 |
| 3,017,389 | 1/1962 | Langsdorf et al. | 260—67 |

WILLIAM H. SHORT, *Primary Examiner.*

L. M. MILLER, *Examiner.*

LOUISE P. QUAST, *Assistant Examiner.*